United States Patent
Yi et al.

(10) Patent No.: US 10,110,742 B2
(45) Date of Patent: *Oct. 23, 2018

(54) SYSTEMS AND METHODS FOR SYNCING DATA RELATED TO VOICE CALLS VIA A DYNAMICALLY ASSIGNED VIRTUAL PHONE NUMBER

(71) Applicant: Google Inc., Mountain View, CA (US)

(72) Inventors: Seung Yi, Mountain View, CA (US); Anshul Kothari, Cupertino, CA (US); Amit Agarwal, Mountain View, CA (US); Monica Chawathe Lenart, Mountain View, CA (US); Ajit Apte, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/717,383

(22) Filed: Sep. 27, 2017

(65) Prior Publication Data

US 2018/0020096 A1    Jan. 18, 2018

Related U.S. Application Data

(63) Continuation of application No. 14/971,751, filed on Dec. 16, 2015, now Pat. No. 9,781,265.
(Continued)

(51) Int. Cl.
*G06Q 30/02* (2012.01)
*H04M 3/51* (2006.01)

(52) U.S. Cl.
CPC ...... *H04M 3/5175* (2013.01); *G06Q 30/0242* (2013.01); *G06Q 30/0277* (2013.01); *H04M 3/5183* (2013.01); *H04M 2215/0192* (2013.01)

(58) Field of Classification Search
CPC .......... G06Q 30/0277; G06Q 30/0242; H04M 2215/0192; H04M 3/4878; H04M 3/5175; H04M 3/5183
See application file for complete search history.

(56) References Cited

U.S. PATENT DOCUMENTS

| 6,856,673 | B1 | 2/2005 | Banks et al. |
| 8,259,915 | B2 * | 9/2012 | Berk ...................... G06Q 30/02 370/352 |

(Continued)

FOREIGN PATENT DOCUMENTS

| JP | 2005-115945 A | 4/2005 |
| JP | 2009-514351 | 4/2009 |
| JP | 5478500 | 2/2014 |

OTHER PUBLICATIONS

International Search Report and Written Opinion for PCT/US2016/055471 dated Dec. 1, 2016. 88 pages.
(Continued)

*Primary Examiner* — Nafiz E Hoque
(74) *Attorney, Agent, or Firm* — Foley & Lardner LLP

(57) ABSTRACT

The present disclosure is directed to syncing data related to voice calls via dynamically assigned virtual phone numbers. A system receives a voice call entry from a content provider. The system access a lot data structure to parse the log data structure. The system matches a device identifier of the voice call entry with a device identifier of the log entry. The system determines that a predetermined threshold is satisfied by a time or duration of the log entry. The system retrieves a virtual phone number from the log entry. The system performs a lookup to determine a content item impression identifier. The system stores data provided via the voice call entry.

20 Claims, 4 Drawing Sheets

Related U.S. Application Data

(60) Provisional application No. 62/238,645, filed on Oct. 7, 2015.

(56) References Cited

U.S. PATENT DOCUMENTS

| | | | | |
|---|---|---|---|---|
| 8,312,042 | B2* | 11/2012 | LeBeau | G06F 17/3087 |
| | | | | 707/782 |
| 8,874,086 | B2* | 10/2014 | Huang | G06Q 30/02 |
| | | | | 379/70 |
| 9,406,076 | B1* | 8/2016 | Agrawal | H04L 47/828 |
| 2005/0251445 | A1* | 11/2005 | Wong | G06Q 30/02 |
| | | | | 705/14.69 |
| 2007/0083408 | A1 | 4/2007 | Altberg et al. | |
| 2007/0140446 | A1 | 6/2007 | Haldeman et al. | |
| 2008/0275785 | A1* | 11/2008 | Altberg | G06Q 30/02 |
| | | | | 705/14.54 |
| 2011/0107362 | A1* | 5/2011 | Reilly | H04N 7/17318 |
| | | | | 725/23 |
| 2011/0231247 | A1 | 9/2011 | Srinivasan et al. | |
| 2012/0177189 | A1* | 7/2012 | Chatterjee | H04M 3/42059 |
| | | | | 379/93.17 |
| 2014/0074596 | A1* | 3/2014 | Kolluri | G06Q 30/02 |
| | | | | 705/14.45 |
| 2015/0066633 | A1* | 3/2015 | Agrawal | G06Q 30/0246 |
| | | | | 705/14.45 |

OTHER PUBLICATIONS

U.S. Notice of Allowance on U.S. Appl. No. 14/971,751 dated Jun. 7, 2017.

JP Office Action re JP 2017-567739 dated Jul. 13, 2018.

* cited by examiner

SYSTEMS AND METHODS FOR SYNCING DATA RELATED TO VOICE CALLS VIA A DYNAMICALLY ASSIGNED VIRTUAL PHONE NUMBER

CROSS-REFERENCES TO RELATED APPLICATIONS

This application claims the benefit of priority under 35 U.S.C. § 120 as a continuation of U.S. patent application Ser. No. 14/971,751, filed on Dec. 16, 2015, which claims the benefit of priority under 35 U.S.C. § 119 to U.S. Provisional Patent Application No. 62/238,645, filed on Oct. 7, 2015, each of which are hereby incorporated by reference herein in their entirety.

BACKGROUND

In a networked environment such as the Internet, entities such as people or companies provide information for display on web pages or other interface by a computing device. The web pages can include text, video, or audio information provided by the entities via a web page server for display on the Internet. Additional content such as electronic advertisements can also be provided by third parties for display on the web pages together with the information provided by the entities. Thus, a person viewing a web page can access the information that is the subject of the web page, as well as selected third party advertisements that may or may not be related to the subject matter of the web page.

SUMMARY

Systems and methods of the present disclosure are directed to a data processing system for syncing or matching voice call entries received from a content provider with log entries maintained or detected by the data processing system. The voice call entries received from the content provider may be inaccurate or otherwise corrupt. The data processing system can be configured to match the received voice call data to the data processing system's internal log entries using one or more data processing techniques that resolve the inaccurate or otherwise corrupt data.

At least one aspect is directed to a method of syncing data via a network. The data can be related to voice calls made using a virtual phone number dynamically assigned by a data processing system. The method can include a data processing system receiving a voice call entry corresponding to a voice call received by a provider device of a content provider. The data processing system can receive the voice call entry from the content provider via a communication channel established using a content account identifier. The voice call entry can include a first field identifying a device identifier of a device initiating the voice call, a second field identifying a start time of the voice call, and a third field identifying a duration of the voice call. The method can include the data processing system accessing a log data structure maintained in memory of the data processing system. The log data structure can store or include a plurality of log entries corresponding to voice calls received by the data processing system. The method can include the data processing system parsing the log data structure to identify a log entry of the plurality of log entries that corresponds to the voice call entry. The method can include the data processing system matching the device identifier included in the voice call entry with a device identifier indicated in the log entry. The method can include the data processing system determining that at least one of the start time or the duration of the voice call entry satisfies a predetermined threshold of a respective start time or duration of the log entry. The data processing system can make this determination responsive to matching the device identifier. The method can include the data processing system retrieving a virtual phone number from the log entry responsive to determining that the predetermined threshold is satisfied. The data processing system dynamically assigned the virtual phone number to a content item of the content provider and provided the virtual phone number to the device having the device identifier responsive to an interaction with the content item of the content provider. The method can include the data processing system performing a lookup in a content item impression data structure. The data processing system can use the identified virtual phone number to perform the look and determine a content item impression identifier identifying an impression of a content item that resulted in a provision of the virtual phone number to the content item. The method can include the data processing system storing, in a data structure corresponding to the content item impression identifier, data provided via the voice call entry.

Another aspect is directed to a system to sync data via a network. The system can include a data processing system having one or more processors. The system can include a provider interface and matching engine executed by the one or more processors of the data processing system. The provider interface can receive a voice call entry corresponding to a voice call received by a provider device of the content provider. The provider interface can receive the voice call entry from a content provider via a communication channel established using a content account identifier. The voice call entry can include a first field identifying a device identifier of a device initiating the voice call, a second field identifying a start time of the voice call, and a third field identifying a duration of the voice call. The matching engine can access a log data structure maintained in memory of the data processing system. The log data structure can store or include a plurality of log entries corresponding to voice calls received by the data processing system. The data processing system can parse the log data structure to identify a log entry of the plurality of log entries that corresponds to the voice call entry. The data processing system can match the device identifier included in the voice call entry with a device identifier indicated in the log entry. The data processing system can determine that at least one of the start time or the duration of the voice call entry satisfies a predetermined threshold of a respective start time or duration of the log entry. The data processing system can make this determination responsive to matching the device identifier. The data processing system can retrieve a virtual phone number from the log entry responsive to determining that the predetermined threshold is satisfied. The data processing system dynamically assigned the virtual phone number to a content item of the content provider and provided the virtual phone number to the device having the device identifier responsive to an interaction with the content item of the content provider. The data processing system can perform a lookup in a content item impression data structure. The data processing system can use the identified virtual phone number to perform the look and determine a content item impression identifier identifying an impression of a content item that resulted in a provision of the virtual phone number to the content item. The data processing system can store, in a data structure corresponding to the content item impression identifier, data provided via the voice call entry.

Yet another aspect is directed to a non-transitory computer readable medium having instructions to provide sync data via a computer network. The instructions can include instructions to receive a voice call entry corresponding to a voice call received by a provider device of the content provider. The instructions can include instructions to receive the voice call entry from a content provider via a communication channel established using a content account identifier. The voice call entry can include a first field identifying a device identifier of a device initiating the voice call, a second field identifying a start time of the voice call, and a third field identifying a duration of the voice call. The instructions can include instructions to access a log data structure maintained in memory of the data processing system. The log data structure can store or include a plurality of log entries corresponding to voice calls received by the data processing system. The instructions can include instructions to parse the log data structure to identify a log entry of the plurality of log entries that corresponds to the voice call entry. The instructions can include instructions to match the device identifier included in the voice call entry with a device identifier indicated in the log entry. The instructions can include instructions to determine that at least one of the start time or the duration of the voice call entry satisfies a predetermined threshold of a respective start time or duration of the log entry. The instructions can include instructions to make this determination responsive to matching the device identifier. The instructions can include instructions to retrieve a virtual phone number from the log entry responsive to determining that the predetermined threshold is satisfied. The virtual phone number can be dynamically assigned to a content item of the content provider and provided the virtual phone number to the device having the device identifier responsive to an interaction with the content item of the content provider. The instructions can include instructions to perform a lookup in a content item impression data structure. The instructions can include instructions to use the identified virtual phone number to perform the look and determine a content item impression identifier identifying an impression of a content item that resulted in a provision of the virtual phone number to the content item. The instructions can include instructions to store, in a data structure corresponding to the content item impression identifier, data provided via the voice call entry.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Figure 1:
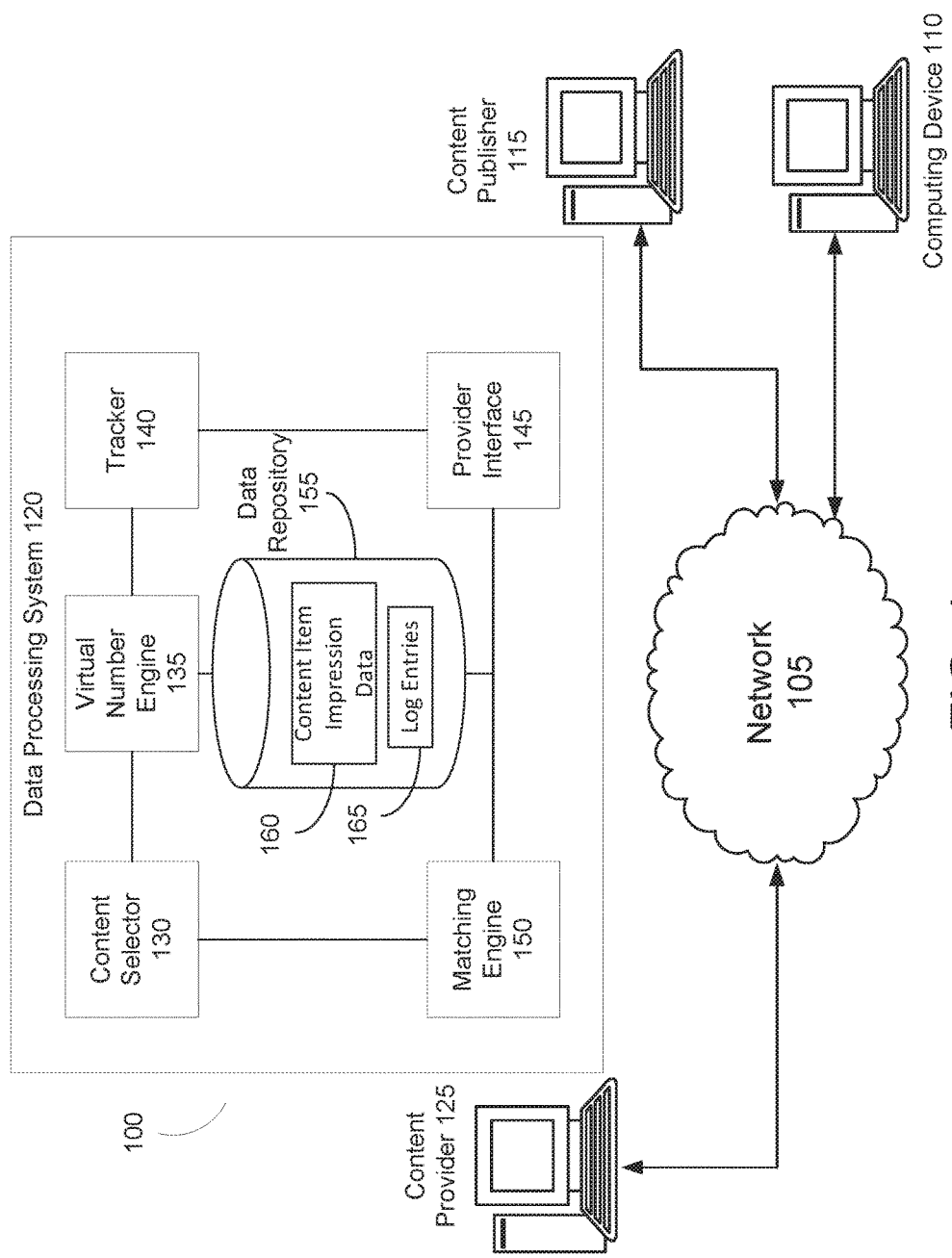
FIG. 1 is an illustration of a system to sync data related to voice calls via a dynamically assigned virtual phone number in accordance with an implementation.

Systems and methods of the present disclosure are directed to a data processing system for syncing or matching voice call entries received from a content provider with log entries maintained or detected by the data processing system. Voice call entries received from the content provider may be inaccurate or otherwise corrupt. The data processing system can be configured to match the received voice call data to the data processing system's internal log entries using one or more data processing techniques that resolve the inaccurate or corrupt data.

Content providers such as advertisers may receive a large number of phone calls from potential customers as a result of running phone call focused content campaigns (e.g., advertisement campaigns). The content provider may benefit from a report identifying content items that led to phone calls that resulted in conversions. However, it may be challenging for a data processing system to accurately and reliably identify a content item that led to the phone call (which then led to a conversion) because the information content providers can provide about a phone call is limited or imperfect. For example, content providers may only have access to a call identifier of a device (e.g., caller ID) that initiated the phone call, a call start time, and a call duration. The data processing system can separately log information about a call, such as the device identifier, call time and call duration. However, the call start time and duration detected by the data processing system may vary from the call start time and duration recorded by content provider due to different timing policies, out-of-sync timers, or time skews due to daylight savings time.

Thus, due to the limited number of signals and variability in recording or measuring the signals, it may be challenging for the data processing system to locate a particular phone call from log data detected by the data processing system that corresponds to voice call entries separately provided by the content provider.

The data processing system of the present solution can generate a report that ties, links or associates two or more of advertisement impressions, clicks, selections, phone calls, or conversions. The data processing system can perform the association using voice call entries received from a content provider via a data file. The data processing system can generate or provide an interface via which the content provider can upload the data file. In some cases, the data processing system may include a data feed interface or streaming interface via which the content provider provides voice call entries. The voice call entry can include a device identifier of a device used to initiate the voice call (e.g., a caller ID), voice call start time, voice call duration, and corresponding conversion information as determined by the content provider. The data processing system can correlate or match the uploaded voice call entry data that is not completely reliable, to internally detected log entries. The data processing system resolves inaccuracies in input including skews in call start time and call duration by creating one or more of a time window (or time range) or a duration window (or duration range) that can be used to match calls with inaccurate time information. In the event the data processing system identifies multiple voice call entries matching a log entry (or multiple log entries matching a voice call entry), the data processing system can launch a tie-breaking to attribute or assign one of the voice call entries to the log entry (or one of the log entries to the voice call entry).

In some implementations, the data processing system provides a call content item for display via a device (e.g., a call computing device such as a mobile device) to a potential customer. In some implementations, the call content item can be an advertisement configured to provide a phone number to allow the potential customer to call the computing device. The data processing system can dynamically generate, assign or allocate a virtual phone number for the call content item that directs voice calls to the data processing system. The potential customer can select or dial the phone number indicated via the call content item. The data processing system can receive the voice call and bridge or forward the voice call to a provider device (e.g., a call computing device of a support agent) of the content provider. When the customer initiates the phone call, the data processing system can identify the customer's caller ID and create an encrypted caller ID data format. The data processing system can store the encrypted caller ID data format in a log or other database maintained by the data processing system. In some implementations, the data processing system can use a hashing technique to facilitate encrypting the caller ID. The encrypted caller ID stored in memory may correspond to the device identifier of the device. The data processing system can tag the caller ID with a query origin, such as search signed-in, search non-signed-in, contents, etc. At a later time, the data processing system can receive voice call entries including conversion data uploaded by a content provider that includes one or more of the following: 1) caller ID; 2) call start time with time zone information; 3) call duration (e.g., in seconds); 4) conversion label (e.g., purchase, subscription, or survey); 5) conversion time; 6) conversion value (e.g., price or other term associated with the conversion); 7) conversion currency (e.g., United States dollars); or 8) a phone number of the content provider device on which the call was received and conducted. The system can then perform a lookup using a re-generated encrypted caller ID as a lookup key to match the internally stored encrypted caller ID with the advertiser uploaded call data.

In an illustrative example, a voice call entry can include data fields with the following values: start_time: 2015-01-20 00:09:00; time_zone: America/Los Angeles; call_duration: 30 seconds; device_identifier: 1234; conversion label: purchase. The data processing system can convert the call start time to a time zone agnostic timestamp (e.g., Coordinated Universal Time "UTC" or Greenwich Mean Time "GMT"). The data processing system can generate a query with respective ranges for call time and call duration. The data processing system can then perform a lookup in a log entry data structure using the query with the ranges to identify a log entry matching the voice call entry. In some cases, the data processing system can account for daylight savings issues by using logic to expand the call start time query range to include multiple timestamps. In some cases, the data processing system can identify a tie between multiple valid advertisement click identifiers, and then use logic to break the tie.

In some implementations, the data processing system selects and provides a call content item for display with a webpage. The call content item may include an advertisement (e.g., supplemental content item) in the form of a sponsored link (e.g., image, multimedia, video, text) included by the search engine (e.g., via content selector) in or alongside the search results (e.g., main content). In some cases, the call content item may include an advertisement in the form of a sponsored link in or alongside main content provided by content publisher (e.g., an article or multimedia stream). The content item may include a link or button to a phone number. The data processing system can select, allocate, generate, provision or assign the phone number to facilitate providing tracking data to a content provider. This number may be a virtual phone number that is dynamically assigned, provisioned, allocated or generated for the content item responsive to interaction with the content item. A user can interact with the content item by selecting or clicking on a call button of the call content item to receive the virtual phone number. The user can then calls the provided number. The data processing system then receives the call and identifies tracking values associated with the call and the content item. For example, the data processing system may tie, link, or otherwise associate the virtual phone number with this impression of the content item. The data processing system may then access an impression log for this content item, which may include keywords of the content item, the website the content item was displayed with, time of day, content network, or a search query with which the content item matched.

In some implementations, the data processing system may initiate a call to the content provider and then bridge the two portions of the call (e.g., bridge the customer's call to the data processing system with the data processing system's call to the content provider). In some implementations, the data processing system may forward the call to the content provider. The content provider may determine, during or after the call, that a conversion occurred via the call (e.g., a purchase was made). The content provider can provide the conversion information to the data processing system. The data processing system can identify the content item impression data or tracking data corresponding to the call made via the virtual phone number, and update the content item impression record or data with the conversion information to generate a performance report.

In another illustrative implementation of providing an improved user experience, the data processing system receives a search query input into a search engine. The data processing system, responsive to the search query, provides search results and further selects and provides a call advertisement for display with the search results that matches the search query. The call advertisement may display a virtual phone number for the advertiser. The call advertisement may display the virtual phone number responsive to receiving an indication of interest in the call advertisement (e.g., a click or selection or other interaction with the call advertisement). The user may call the advertiser associated with the call advertisement using the number provided via the call advertisement. The content provider may determine, during or after the call, that a conversion occurred via the call, such as a purchase of goods or service. The content provider can provide the conversion information to the data processing system. The data processing system can identify the content item impression data or tracking data corresponding to the call made via the virtual phone number, and update the content item impression record or data with the conversion information to generate a performance report.

The data processing system can be configured to use virtual phone numbers. A virtual phone number may refer to a telephone number without a directly associated physical telephone line. A virtual phone number may refer to a telephone number that is not static in that the telephone number may not be directly associated with a device. These virtual phone numbers can be programmed to forward incoming calls to one of the pre-set telephone numbers chosen by a content provider; either Fixed, Mobile or VoIP. A virtual phone number can work like a gateway between traditional calls (PSTN) and VOIP. Subscribers to virtual phone numbers may use their existing phones, without the need to purchase additional hardware. A virtual telephone number can be set to forward calls to different telephone numbers depending on the time of day and the day of the week.

The data processing system can be further configured to use the virtual phone number with a content item to track calls made to the content provider. For example, with a call extension content item or call-only content item, the virtual phone number (or content forwarding number) can facilitate receiving and tracking phone calls resulting from the content item. To do so, the data processing system can assign, select or otherwise provide a virtual phone number to be displayed with the content item of a content provider. When a potential customer calls this virtual phone number, the data processing system receives the call and routes the call to the corresponding content provider. The content provider may then obtain information about the calls generated by the content item. In some cases, the data processing system may maintain the anonymity of the customer by providing the forwarding number as the caller identification number, rather than the customer's number.

In some implementations, the data processing system can record information about the content item or content item information when the data processing system assigns the virtual phone number to the content item. When the data processing system receives a call, the data processing system can look up the recorded information from the virtual number record, and log that information about the content item along with the call information. Thus, in some implementations, the data processing system can indirectly rely on the virtual number to link the phone call to the originating content item, without using the virtual number to look up logs.

FIG. 1 illustrates an example system 100 for syncing data via a network. The system 100 can include content selection infrastructure. The system 100 can include a data processing system 120 communicating with one or more of a content provider 125, content publisher 115 or computing device 110 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be displayed on at least one computing device 110, such as a laptop, desktop, tablet, personal digital assistant, smart phone, or portable computers. For example, via the network 105 a user of the computing device 110 can access web pages provided by at least one web site operator or content publisher 115. In this example, a web browser of the computing device 110 can access a web server of the web site operator or content publisher 115 to retrieve a web page for display on a monitor of the computing device 110. The web site operator or content publisher 115 generally includes an entity that operates the web page. In one implementation, the web site operator or content publisher 115 includes at least one web page server that communicates with the network 105 to make the web page available to the computing device 110.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 120. The data processing system 120 can include at least one logic device such as a computing device having a processor to communicate via the network 105, for example with the computing device 110, the web site operator or content publisher computing device 115 (or content publisher 115), and at least one content provider computing device 125 (or provider device 125 or content provider 125). The data processing system 120 can include at least one server. For example, the data processing system 120 can include a plurality of servers located in at least one data center. The data processing system 120 can include multiple, logically-grouped servers and facilitate distributed computing techniques. The logical group of servers may be referred to as a server farm or a machine farm. The servers can also be geographically dispersed. A machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralizing the servers and storage systems and coupling them with advanced system management tools allows more efficient use of server resources.

The data processing system 120 can include a content placement system having at least one server. The data processing system 120 can include at least one content selector 130, at least one virtual number engine 135, at least one tracker 140, at least one provider interface 145, at least one matching engine 150, and at least one data repository 155. The content selector 130, virtual number engine 135, tracker 140, provider interface 145, and matching engine 150 can each include at least one processing unit or other logic device such as programmable logic array engine, or module configured to communicate with the database repository or database 155. The content selector 130, virtual number engine 135, tracker 140, provider interface 145, matching engine 150 and data repository 155 can be separate components, a single component, or part of the data processing system 120. The system 100 and its components, such as a data processing system, may include hardware elements, such as one or more processors, logic devices, or circuits.

The data processing system 120 can obtain anonymous computer network activity information associated with a plurality of computing devices 110. A user of a computing device 110 can affirmatively authorize the data processing system 120 to obtain network activity information corresponding to the user's computing device 110. For example, the data processing system 120 can prompt the user of the computing device 110 for consent to obtain one or more types of network activity information. The identity of the user of the computing device 110 can remain anonymous and the computing device 110 may be associated with a unique identifier (e.g., a unique identifier for the user or the computing device provided by the data processing system or a user of the computing device). The data processing system can associate each observation with a corresponding unique identifier.

For situations in which the systems discussed here collect personal information about users, or may make use of personal information, the users may be provided with an opportunity to control whether programs or features that may collect personal information (e.g., information about a user's social network, social actions or activities, a user's preferences, or a user's current location), or to control whether or how to receive content from the content server that may be more relevant to the user. In addition, certain data may be treated in one or more ways before it is stored or used, so that certain information about the user is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server.

The data processing system 120 can receive a request for content. The request may include a query such as a search query input into a search engine 130 of the data processing system. The input query may include text, characters, or symbols, for example. The data processing system 120 may receive the input query from a computing device 110 via network 105. The input query may include audio such as words spoken by a user of the computing device 110 and input into the search engine of the data processing system via network 105 and an interface. The request may include or be associated with information that facilitates selecting content responsive to the request. The information may include, e.g., contextual information about an electronic document, web page, electronic application, or organic, non-advertisement link on which the selected content is to be displayed. The data processing system 120 may provide an interface displaying input text boxes, buttons, drop downs, or otherwise widgets through which a user of a client can select or otherwise indicate a category for the search.

Responsive to the search query or other request for content (e.g., electronic advertisements), the data processing system 120 (e.g., via content selector 130) can identify, select or otherwise obtain content to be provided or presented via the computing device 110 making the request, or some other computing device 110 associated with the request for content. In some implementations, the data processing system 120 may identify, select, or otherwise obtain content not responsive to receiving any request. The content may include, e.g., text, characters, symbols, images, video, audio, or multimedia content. The content may include a phone number, a virtual phone number, or a call extension. The content item may include an advertisement in the form of a sponsored link provided by content providers and included by data processing system (e.g., via content selector) for display with the search results page. The content item may include a link or button to a phone number that facilitates providing reporting data to a content provider. In cases where the content item includes a virtual phone number or a call extension, the content item may be referred to as a call content item. The request for content can include a request for an online advertisement, article, promotion, coupon, or product description. The data processing system 120 can receive the request from a computing device such as, e.g., computing device 110. For example, the data processing system 120 can receive the request via an application executing on the computing device 110, such as a mobile application executing on a mobile device (e.g., smart phone or tablet). In some cases, the data processing system 120 may not receive a separate request for content and, instead, select and provide the content (e.g., advertisement) responsive to the search query or with search results. In some instances, a web page may request content from the data processing system 120 responsive to a user of a mobile device 110 visiting the web page (e.g., via a mobile device 110).

The request for content can include information that facilitates content selection. For example, the data processing system 120 may request information from the computing device 110 to facilitate identifying content or content selection. The data processing system 120 may request or obtain information responsive to receiving a request for content from the computing device 110. The information may include information about displaying the content on the computing device 110 (e.g., a content slot size or position) or available resources of computing device 110 to display or otherwise manipulate the content.

The data processing system 120 may identify multiple content items (e.g., a first candidate content item and a second candidate content item) that are responsive to the request for content, or are otherwise candidates for display on an online document (e.g., a web page). The data processing system may initiate or utilize an online auction process to select one or more of the multiple content items for display on the online document. An auction system may determine two or more bids for content items to be displayed in an online document. The auction system can run the bids through an auction process to determine one or more winning bids. Content items corresponding to the winning bids may be selected for display on or with the online document.

The data processing system 120 may include a content selector 130. The content selector 130 may analyze, parse, or otherwise process subject matter of candidate content items to determine whether the subject matter of the candidate content items correspond to a web page. The content selector 130 may identify, analyze, or recognize terms, characters, text, symbols, or images of the candidate content items using an image processing technique, character recognition technique, or database lookup. The candidate content items may include metadata indicative of the subject matter of the candidate content items, in which case the content selector 130 may process the metadata to determine whether the subject matter of the candidate content item corresponds to the web page or search query.

Content providers may provide additional indicators when setting up a content campaign that includes content items. The content provider may provide information at the content campaign or content group level that the content selector 130 may identify by performing a lookup using information about the candidate content item. For example, the candidate content item may include a unique identifier, which may map to a content group, content campaign, or content provider. The content selector 130 may determine, based on information stored in data repository 155 about the content provider.

The data processing system 120 may select the content using various techniques. For example, the data processing system 120 may select content from a referral or a lead from a partner content selection network. In some implementations, the content may not be selected using a keyword or matching technique, but be selecting based on a referral or a lead.

The data processing system 120 may include a virtual number engine 135. The virtual number engine 135 can be designed and constructed to identify a unique virtual phone number (e.g., unique forwarding number). The virtual number engine 135 may provide the unique virtual phone number for display with the selected content item being displayed with a webpage on a client computing device 110. The virtual number may be unique because it uniquely corresponds to a content provider's device or call agent. The virtual number may be unique because it uniquely maps to a content provider's device or call engine. The virtual number engine 135 may provide a link to the unique virtual phone number that, when selected by a user of the computing device 110, causes the computing device 110 to initiate a communications channel with the data processing system 120. For example, selecting the link provided by the virtual number engine 135 via the computing device 110 can initiate a phone call to the data processing system 120.

In some implementations, the data processing system 120 can provide the virtual phone number for display with the content item on the webpage responsive to receiving an indication of interest in the content item. For example, the data processing system 120 can display the content item on the webpage with a button, drop down menu, icon, roll-over icon, or other user interface widget. When a user interacts with the user interface widget (e.g., clicking or selecting a button), the data processing system can receive an indication of the user selection.

Responsive to receiving the indication of user selection, the data processing system 120 can identify, select, generate or otherwise assign a virtual phone number to the content item. The data processing system 120 may access a pool or repository of available virtual phone numbers. The virtual phone numbers may already be assigned to the content provider associated with the content item. The virtual phone numbers may be assigned to a content campaign or a content group that includes the content item. The virtual phone number may be a toll free "800" number, a charge number such as a "900" number, a local number, or a long distance number.

The data processing system may determine the virtual phone number to be an available virtual phone number if the virtual phone number is not currently assigned to another content item or content provider. For example, due to the limited number of virtual phone numbers and the costs associated with purchasing phone numbers, the virtual number engine 135 may be configured with one or more policies that facilitate reusing or recycling virtual phone numbers. The virtual number engine 135 may reuse a virtual number if the number has not been provided for display for a time interval or duration (e.g., 2 hours, 24 hours, 72 hours, a week, 30 days, 60 days, 90 days, etc.). The data processing system can use the same virtual number for different provider devices. The data processing system can determine to which provider device to forward the call based on a caller ID of the caller and the virtual phone number. For example, the data processing system can form a tuple based on the caller ID (or device identifier) and virtual phone number. The tuple may map to a unique static identifier of the provider device of the content provider. The data processing system can maintain this tuple as a unique tuple. Thus, the data processing system can reuse the virtual phone number with a second device identifier of a second device that is different from the first device, and generate a second unique tuple based on the second identifier and virtual phone number that maps to a second provider device of a second content provider. By preserving the tuple mapping, the data processing system can reuse virtual phone numbers, thereby reducing the amount of virtual phone numbers the data processing system maintains.

Figure 2:
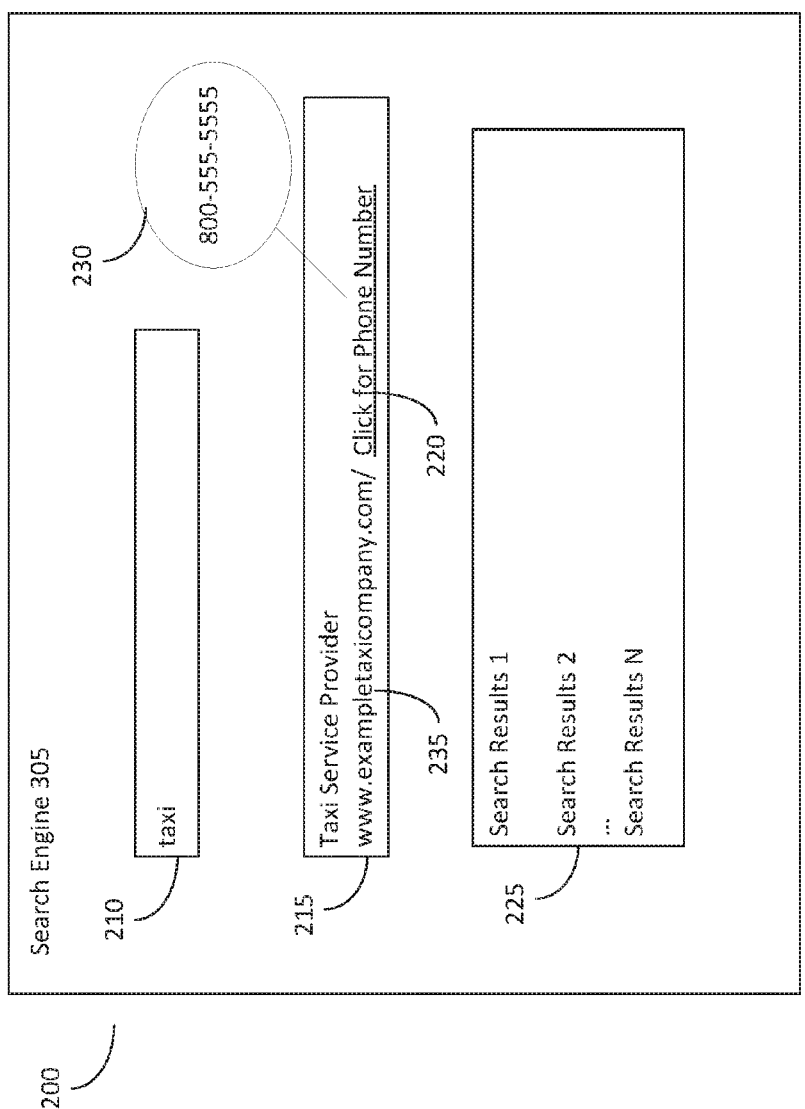
FIG. 2 is an illustration of a user interface for providing a call content item in accordance with an implementation.

The virtual phone number can be provided with a content item via a user interface. An example of a user interface provided by the data processing system is illustrated in FIG. 2. The user can initiate a phone call corresponding to the virtual phone number provided or otherwise conveyed via the user interface.

The data processing system 120 may include a tracker 140. The tracker 140 may be designed and constructed to receive, obtain, determine or otherwise identify tracking data such as content item impression data or log entry data and store the data in data repository 155 in one or more databases or data structures such as content item impression data structure 160 or log entry data structure 165. Content item impression data may include information associated with a content item, selection of the content item, or an impression of the content item. For example, tracking data may include content selection criteria that were used to select the content item for display with or on a web page. Content selection criteria may include keywords, terms, phrases, geographic location, device type, etc. The tracker 140 may obtain tracking data from or via the content selector 130, a content provider 125, or a user's computing device 110. In some cases, the content selector 130 may store the tracking data in an impression log or data structure, and the tracker 140 may obtain the tracking data from the impression data structure.

The tracker 140 can detect, identify, determine or otherwise obtain log entry data. Log entry data can include voice call information associated with the content item impression. Voice call information can include, e.g., a start time of a voice call, a device identifier of a device that initiated the voice call (e.g., a caller ID of the computing device 110 that calls the virtual phone number provided by the call content item), and a duration of the voice call. The data processing system 120 can detect the start time of the voice call responsive to receiving the call. The data processing system 120 can include a counter, timer, clock, or other timing device configured to generate a time stamp responsive to receiving the call. In some cases, the data processing system 120 generate a time stamp in a time zone. The data processing system 120 can generate the time stamp in a default time zone, such as UTC or GMT. The data processing system 120 can generate the time stamp in a predetermined format, that includes, for example, the date and time and includes seconds as follows: <YYYY-MM-DD> <HH:MM:SS>, where YYYY corresponds to the year in four digits; MM corresponds to the month number in two digits; HH corresponds to the hour in a 24 hour format in two digits; MM corresponds to minutes in two digits; and SS corresponds to seconds in two digits. For example, the time stamp can be: 2015-01-20 00:09:00. In some cases, the data processing system 120 can generate the time stamp in a time zone corresponding to a location of the computing device 110, or a location of a content provider 125 that provided the content item that resulted in the phone call. For example, the data processing system 120 can determine, from a content account of the content item, location information established by the content provider 125. In some cases, the content item can include location information (e.g., an address for a restaurant).

The data processing system 120 can determine a duration of the voice call. The data processing system 120 can monitor the call subsequent to bridging the call between the computing device and the provider device of the content provider. The data processing system 120 can monitor the call to detect termination of the call responsive to one or more parties to the call hanging up, ending the call, disconnecting from the call, or otherwise disengaging from the voice call. The data processing system 120 can determine, via the timer/counter/clock of the data processing system 120, a second time stamp corresponding to termination of the call. The data processing system 120 can determine the duration of the call by determining a difference between the termination time stamp and the start time stamp. In some cases, the data processing system 120 may initiate or start a stopwatch or counter responsive to initiation of the call and stop the counter or stopwatch responsive to termination of the call. The data processing system 120 can then determine the duration of the call based on a value of the counter. The format of the duration can be, e.g., HH:MM:SS.

For example, the log entry data structure 165 stored in data repository can include the following information shown in Table 1. The log entry data structure 165 can include a table format or other data format for storing, maintaining, organizing or manipulating log entries for voice calls received by the data processing system 120.

TABLE 1

Illustrative Example of Log Entry Data Structure

| Device Identifier | Start Time | Duration | Virtual Phone Number |
| --- | --- | --- | --- |
| 1234ABC | 2015 Jan. 20 00:09:00 | 00:15:34 | 800-555-4567 |
| 1235DEF | 2015 Jan. 20 00:15:00 | 00:12:10 | 800-555-7890 |
| 1235GHI | 2015 Jan. 20 00:18:00 | 00:25:45 | 800-555-7890 |
| 1234ABC | 2015 Jan. 21 00:7:00 | 00:07:34 | 800-555-4567 |

The tracker 140 may be configured to obtain and store the log entry responsive to receiving a selection from a user's computing device 110 of the content item or a phone call from the computing device 110. The tracker 140 may be configured to obtain and store the content item impression record responsive to providing the content item, receiving a selection from a user's computing device 110 of the content item, or receiving a phone call from the computing device 110. The selection may include a click of the content item.

In some cases, the selection may refer to a selection of the phone number link (e.g., link 220). For example, the tracker 140 may not store the log entry data responsive to a selection of link 230, but the tracker 140 may store the log entry data responsive to receiving a selection of the phone number link 220 (or a request for a phone number), or a phone call. The data processing system 120 may be configured to distinguish between a selection of the URL 230 as compared to the selection or request for a phone number via phone number link 220.

The content item impression data structure 160 can be stored in data repository 155. The content item impression data structure 160 can include a table format or other data format for storing, maintaining, organizing or manipulating impression records. An impression record may refer to an instance of displaying a content item or advertisement on a web page. The impression may include information about the web page on which the content item is displayed (e.g., uniform resource locator of the web page, location/position of the content slot, keywords of the web page), search query input by the user into a search engine that resulted in the content item being selected, a keyword of the content item and/or a keyword of the web page or search query that resulted in the content item being selected for display (e.g., via a broad, phrase or exact match or other relevancy or similarity metric), time stamp associated with the impression, geographic location of the computing device 110 on which the content item is displayed, or type of device.

The data processing system 120 may store content item impression records in the content item impression data structure on a temporary basis and remove or delete the impression records after some duration (e.g., 24 hours, 48 hours, 72 hours, 30 days, 60 days, 90 days, etc.). The data processing system 120 may remove the impression records responsive to an event, condition or trigger. For example, the data processing system 120 may delete the impression record responsive to a request to delete impression history information, or after a time interval or duration after termination of the call associated with the impression.

The data processing system 120 (e.g., via tracker 140) can generate a link between the tracking data stored in the impression data structure and the virtual phone number stored in the database. The link may include a pointer or other association mechanism between the tracking data and the virtual phone number. In some cases, the tracker 140 may update the impression record in the impression data structure with the mapped virtual phone number. In some cases, generating the link may refer to the data processing system 120 generating a second data structure or data record or entry that includes the tracking data and the virtual phone number. For example, the tracker 140 may create a tracking link data structure that provides an entry with the tracking data that is associated with a corresponding virtual phone number. This data structure may further include information about the impression record or the computing device 110.

The content item impression data structure 165 can include the following fields as illustrated in Table 2:

TABLE 2

Illustrative Example of Content Item Impression Data Structure

| Virtual Phone Number | Content Impression ID | Impression Time | Content Item ID | Content Campaign/ Group ID | Content Provider ID | Keywords | Bid |
|---|---|---|---|---|---|---|---|
| 800-555-4567 | 101202 | 2015-01-20 00:08:50 | Item_1 | Camp_A | Provider_A | Television | 0.2 |
| 800-555-7890 | 101203 | 2015-01-20 00:14:30 | Item_2 | Camp_A | Provider_A | computer | 0.1 |
| 800-555-7890 | 101204 | 2015-01-20 00:17:59 | Item_3 | Camp_B | Provider_B | Vacation | 0.4 |
| 800-555-0123 | 101205 | 2015-01-22 00:12:59 | Item_4 | Camp_C | Provider_B | beach | 0.3 |

One or more value, field, or entry of the log entry data structure can be stored using an anonymous hash technique or encryption technique. In some implementations, the data processing system 120 may remove the link between the tracking data and the virtual phone number based on a condition. The condition may include, e.g.: receiving a request for the virtual phone number but not receiving a call to that number within a duration of providing the number (e.g., 2 hours, 4 hours, 48 hours, 72 hours, a week, etc.); or receiving a certain number of calls to the number (e.g., 2 calls, 3 calls, 5 calls, etc.).

The data processing system 120 (e.g., via the tracker 140 or virtual number engine 135) can provide the first virtual phone number via the webpage. A computing device 110 may include call capabilities and may initiate a call (or other telecommunications channel) to the virtual phone number by dialing the number or selecting an interactive link of the number which initiates a call process of the device 110. In some implementations, a user may initiate the call to the virtual phone number from a device different from the device 110 on which the web page and phone number is displayed. For example, a user may view the web page with the advertisement and phone number from a desktop computer, laptop computer, or tablet, and then call the number from a land line phone or cellular phone. Since the data processing system 120 can assign the virtual phone number to the selection of the content item and link the virtual phone number with the tracking data for the content item, a user may call the virtual phone number from a different device and the data processing system 120 can still access the corresponding tracking data.

The data processing system 120 (e.g., via the virtual number engine 135 or tracker 140) can receive a call from a client device to initiate a first communication channel via the first virtual phone number. For example, the client device may dial the first virtual phone number to initiate the telecommunications channel and the data processing system 120 may receive an indication of initiation of the telecommunication (e.g., a ring). The data processing system 120 may perform one or more functions upon receiving the call (or indication thereof).

Responsive to receiving the call, the data processing system 120 can perform a lookup in a database using the first virtual phone number to identify a second number corresponding to the content provider and to identify content item impression data. For example, the first virtual phone number may be used to call the data processing system 120 and further used to access the linked content item impression data and identify the second number of a provider device. The second number may be used to call the content provider (or customer service representative or agent device thereof).

In some cases, the content provider may provide the second number when setting up the content campaign, and the second number may be stored in a database of the data processing system 120.

The data processing system 120 can, upon identifying the second number, use the second number to establish a second communication channel between the client device and a content provider device. The data processing system 120 may dial the second number and the content provider may receive the call. The content provider (or customer service representative) may answer the call. The data processing system 120 may merge or bridge the first call with the second call to create the second communication channel that connects the user with the customer service representative of the content provider. In some cases, the data processing system 120 includes a bridging module configured to bridge the calls. The bridging module can include hardware or software configured to bridge calls. The bridging module can be configured with a data packet routing or relaying technique to facilitate communication between the computing device initiating the call and the provider device receiving the call.

The data processing system 120 includes a provider interface 145 designed and constructed to receive voice call entries from a content provider 125. The voice call entry can be in the form of a voice call entry data structure. The provider interface 145 can provide a graphical user interface that includes input text boxes, buttons, a file browser, or other input mechanism to allow a content provider to upload, feed, or transfer a data file including voice call entry information. In some cases, the provider interface 145 can include an application programming interface configured to receive a data feed or streaming data in real-time or responsive to the content provider 125 recording or detecting the data or otherwise making the data available to the data processing system 120. In some cases, the provider interface 145 can be configured for periodic uploads of the voice call entries, batch uploads of voice call entries, or real-time feeds of voice call entries. The provider interface 145 can be configured to use one or more network protocol, such as a secure communication protocol (e.g., encrypted communication channel that can require authentication credentials).

The content provider 125 can generate, record, store or maintain the voice call entry in a format. In some cases, the content provider 125 records one or more values for one or more fields in a format that is the same as a format used by the data processing system 120 for the corresponding field. In some cases, the format used by the content provider 125 may vary from the format used by the data processing system 120. In such cases, the data processing system 120 may convert the format of the fields provided by the content provider 125 into a format consistent with the log entry data maintained by the data processing system 120. For example, the start time in the voice call entry can be in a time zone that may be different from the time zone of the log entries in the data processing system. The provider interface 145 can determine the time zone for the start times in the voice call entries and convert the time zone into the same time zone used for the log entries. For example, the voice call entry can include a field for time zone information. The time zone information may indicate a geographic location or a time zone using a time zone identifier, such as Pacific Standard Time ("PST") or Pacific Daylight Savings Time ("PDT"). The data processing system can access a time zone conversion data structure to determine a time offset to use to convert the start time in the voice call entry to the same time zone used in the log entry.

The format for the device identifier may be predetermined by the data processing system 120 or prescribed by the data processing system 120. The format for the device identifier may be in an E.164 format with a preceding "+" sign (e.g., +15555551234"). The data processing system 120 may allow one or more formats for the device identifier, such as: "5555551234", "(555)555-1234", "555-555-1234", "(555) 555-1234". The data processing system can parse the device identifiers using a phone number library. If the data processing system 120 cannot parse a number, the data processing system 120 may report an error to the content provider via provider interface 145. The data processing system 120 can exclude the erroneous voice call entry from further processing.

The start time format can include one or more of the following, for example:
(1) Complete date plus hours and minutes:
   YYYY-MM-DDThh:mmTZD (e.g., 1997-07-16T19:20+01:00)
(2) Complete date plus hours, minutes and seconds:
   YYYY-MM-DDThh:mm:ssTZD (e.g., 1997-07-16T19:20:30+01:00)
(3) Complete date plus hours, minutes, seconds and a decimal fraction of a second
   YYYY-MM-DDThh:mm:ss.sTZD (e.g., 1997-07-16T19:20:30.45+01:00)
where:
   YYYY=four-digit year
   MM=two-digit month (01=January, etc.)
   DD=two-digit day of month (01 through 31)
   hh=two digits of hour (00 through 23) (am/pm NOT allowed)
   mm=two digits of minute (00 through 59)
   ss=two digits of second (00 through 59)
   s=one or more digits representing a decimal fraction of a second
   TZD=time zone designator (Z or +hh:mm or –hh:mm)

Times can be expressed in UTC (Coordinated Universal Time), with a UTC designator ("Z"). Times can be expressed in local time, together with a time zone offset in hours and minutes. A time zone offset of "+hh:mm" indicates that the date/time uses a local time zone which is "hh" hours and "mm" minutes ahead of UTC. A time zone offset of "–hh:mm" indicates that the date/time uses a local time zone which is "hh" hours and "mm" minutes behind UTC.

The voice call entry can include one or more field as follows: device identifier of device initiating the voice call; 2) call start time with time zone information; 3) call duration; 4) conversion label (e.g., purchase, subscription, or survey); 5) conversion time; 6) conversion value (e.g., price or other term associated with the conversion); or 7) conversion currency (e.g., United States dollars). In some cases, the voice call entry data structure can include three fields: device identifier, start time, and duration as illustrated in Table 3. Table 3 illustrates a voice call entry data structure provided by provider_A shown in Table 2.

TABLE 3

Illustrative Example of a Voice Call Entry Data Structure Provided By Content provider.

| Device Identifier | Start Time | Duration | Time Zone |
|---|---|---|---|
| 1234ABC | 2015 Jan. 20 00:08:57 | 00:14:34 | Los Angeles, California |
| 1235DEF | 2015 Jan. 20 00:15:30 | 00:13:10 | Los Angeles, California |

In some cases, the voice call entry data structure can include additional fields, such as a fourth field that indicates a conversion label or a fifth field that indicates a conversion amount or value as shown in Table 4 as follows:

TABLE 4

Illustrative Example of Voice Call Entry Data Structure with Additional Fields

| Device Identifier | Start Time | Duration | Conversion Label | Conversion Value |
|---|---|---|---|---|
| 1234ABC | 2015 Jan. 20 00:08:57 | 00:14:34 | Purchase | $800 |
| 1235DEF | 2015 Jan. 20 00:15:30 | 00:13:10 | Purchase | $200 |

The content provider 125 can determine or assign their own conversion labels; e.g., the conversion labels may not be preset or predetermined by the data processing system 120. The content provider 125 can record or determine the conversion label and amount. The label can include a string, character, symbol, text, numbers, letters, or alphanumeric values.

For example, a potential customer can enter a search query "best cheap television". The data processing system 120 can return search results and also select an advertisement, such as advertisement with content item ID "Item_1" and store the information in a content item impression data structure, such as the data structure illustrated in Table 2. The data processing system 120 can provision virtual phone number 800-555-4567 for the content item. The potential customer can call virtual phone number, and the data processing system 120 can bridge the call to a provider device of the content provider 125 (e.g., an online electronics retail store). The data processing system 120 can detect parameters or values associated with the voice call, such as the device identifier of the customer device initiating the call and start time, and store this information in a log entry, such as the data structure illustrated in Table 1.

The content provider 125 can receive the call and determine that the call came from the device of the customer that has the device identifier of 1234ABC. The content provider 125 can record the device identifier and start time in a voice call entry data structure, such as the data structure illustrated in Table 3. In some cases, the content provider 125 may not record the duration, or only record one of the start time and the duration. The content provider 125 can, upon a conversion such as selling a product to the customer, record the type of conversion with a label such as "purchase", and further record an amount of the conversion, such as the purchase price of $800.

The data processing system 120 can include a matching engine 150 designed and constructed to match, correlate, filter, or otherwise identify a log entry stored in the log entry data structure 165 that corresponds to a voice call entry provided by the content provider 125. The matching engine 150 can determine that there is a discrepancy between one or more values of one or more fields in the log entry of the data processing system and one or more values of one or more fields in the voice call entry provided by the content provider. To resolve the discrepancies, the matching engine 150 can generate a range based on a threshold. For example, the matching engine 150 can identify one or more log entries that correspond to one or more voice call entries by matching the device identifier included in the voice call entry with a device identifier indicated in the log entry. As illustrated in Tables 1 and 2, the device identifier 1234ABC corresponds to two entries in each data structure; the device identifiers 1235DEF and 1235GHI each correspond to one entry in each data structure.

Thereafter, the data processing system 120 can identify a specific voice call using additional fields associated with the voice call entry and log entry. For example, the matching engine 150 can determine that the start time stored in the voice call entry for the device identifier is within a predetermined threshold of the start time stored in the log entry for the device identifier. The matching engine 150 can retrieve the predetermined threshold from data repository 155. The predetermined threshold can be, e.g., 10 seconds, 30 seconds, one minute, two minutes, 10 minutes, 30 minutes, 1 hour, or another threshold that facilitates accurately matching log entries to voice call entries. In some cases, the data processing system 120 can determine that the duration stored in the voice call entry for the device identifier is within a predetermined threshold of the duration stored in the log entry for the device identifier. The matching engine 150 can retrieve the predetermined threshold for duration can be the same as the threshold for the start time, or a different threshold. For example, the predetermined duration threshold can be, e.g., 10 seconds, 30 seconds, one minute, two minutes, 10 minutes, 30 minutes, 1 hour, or another threshold that facilitates accurately matching log entries to voice call entries.

The data processing system 120 can generate a query for a voice call entry using the predetermined threshold. For example, the data processing system 120 can generate a matching query for the first voice call entry in Table 3 that includes device identifier 124ABC and start time 2015-01-20 00:08:57 as follows: query all log entries that include the device identifier 1234ABC and have a start time of 2015-01-20 00:08:57 plus or minus 30 seconds. The data processing system can identify the first log entry stored in the log entry data structure in Table 1 as satisfying this matching query because it has the same device identifier and the start time of 2015-01-20 00:09:00 is within 30 seconds of the start time of the corresponding voice call entry.

In some cases, the data processing system 120 can generate a matching query that determines a match based on the start time and the duration as follows: query all log entries that include the device identifier 1234ABC and have a start time of 2015-01-20 00:08:57 plus or minus 30 seconds and a duration of 00:14:34 plus or minus 5 minutes. The data processing system can identify the first log entry stored in the log entry data structure in Table 1 as satisfying this matching query because it has the same device identifier, the start time of 2015-01-20 00:09:00 is within 30 seconds of the start time of the corresponding voice call entry, and the duration of 00:15:34 is within 5 minutes of the duration of the corresponding voice call entry.

Once the data processing system 120 identifies the matching log entry, the data processing system 120 can retrieve the virtual phone number for the log entry (e.g., 800-555-4567) and perform a lookup in the content item impression data structure using the virtual phone number to identify the corresponding content item impression that resulted in the phone call and conversion. For example, the first entry illustrated in Table 2 is the content item impression record for virtual phone number 800-555-4567. The data processing system can update the content item impression record with additional information provided by the content provider. For example, the data processing system 120 can update the content item impression record to include the conversion label or conversion value (or any other field or value) provided by the content provider via the voice call entry data structure. In some cases, the matching engine 150 can generate a different data structure, such as a report data structure, that can be used to generate a report to the content provider.

The data processing system can generate a report using the conversion information provided by content provider via voice call entry, as well as content item impression information maintained by the data processing system 120. The report can include a dynamic or interactive report provided by the provider interface 145 of the data processing system 120. The report can include a chart, graph, pie chart, bar graph, histogram, table, spreadsheet, contextual report, or images. The report can include performance information such as click through rate, conversion rate, cost-per-click, or return on investment. For example, the content provider may have bid $0.2 to get win the content item auction that resulted in the content item Item_1 being provided to the device identifier 1234ABC. The data processing system 120 can determine that the bid of 0.2 resulted in a conversion of $800. The data processing system can 120 further identify all such bids and costs associated with this content item Item_1 (or content campaign Camp_A) and aggregate these values to generate a return on investment for the call content campaign. For example, the data processing system 120 can identify all voice call entries of the content provider that match log entries, and filter the matching entries based on content item ID or campaign ID to generate a report for a specific content item or campaign. In some cases, the report can be for a content account or content group.

The data processing system 120 (e.g., via matching engine 150) can adjust or tune a threshold used to generate a query with a range. For example, the data processing system 120 can increase the threshold or range if the data processing system does not identify any matching queries or identifies less than 3 matching queries. The data processing system 120 can decrease the threshold or range if the data processing system 120 receives too many matching queries (e.g., more than 2, more than 3, more than 4, or more than 5). In some cases, the data processing system 120 can adjust the threshold specific to a content provider and based on historic matching performance for the content provider. For example, content provider A may provide start time data that is typically within 10 seconds of the start time in the log entry, whereas provider B may provide start time data with a larger discrepancy, such as a 2 minute delta. Thus, the data processing system 120 may use a larger threshold for provider B, as compared to provider A. The data processing system can store the predetermined thresholds in data repository 155. The data processing system can continue evaluate the historical matching performance to tune or adjust the thresholds. The data processing system can update the predetermined threshold stored in data repository 155. For example, data repository 155 can include a threshold data structure.

In some cases, the matching engine 150 can identify multiple log entries that match a single voice call entry. The data processing system 120 may identify multiple log entries that match the single voice call entry because the multiple log entries may have start times that fall within the predetermined threshold or range of the start time of the voice call entry. Responsive to identifying multiple matching entries, the matching engine 150 can initiate a tie breaking mechanism to select the matching log entry that is closes in start time to the voice call entry. For example, the matching engine 150 can determine a first time difference between a start time of the first matching log entry and the start time of voice call entry. The matching engine 150 can determine a second time difference between a start time of the second matching log entry and the start time of the voice call entry. The matching engine 150 can determine an absolute value for the first time difference and second time difference. The matching engine 150 can determine the minimum of the absolute value of the first time difference and the absolute value of the second time difference. The data processing system 120 can select the log entry corresponding to the minimum time difference as the matching log entry, and use this log entry to identify or retrieve the content item impression data and generate the report.

In some cases, the matching can be based on a content item impression time of the content item, as stored in the content item impression data structure. For example, the data processing system 120 may not identify the virtual phone number, and directly correlate the voice call entry with the content item impression record using the start time or other information stored in the content item impression record, such as the content provider ID.

The matching engine 150 can account for daylight savings change in the United States, for example. In the United States, one hour repeats twice during the fall daylight savings change. If a content provider uploads a conversion with a call start time without tagging the time with daylight savings information, the data processing system can generate a query with a threshold that can encompass both possible start times. For example, the threshold for this query can be increased by hour from what the threshold would be otherwise. Thus, the matching engine 150 can automatically account for a conversion that may occur during a daylight savings change even if the content provider does not tag the start time with daylight savings information.

FIG. 2 is a block diagram of a user interface 200 that facilitates providing call context via a computer network in accordance with an implementation. The user interface 200 may include a page displayed by an application executing on a computing device, such as a web page rendered by a web browser. The web page may be an interface for a search engine 205, and include a search query input box 210. Responsive to the search query 210, the search engine 205 provides search results 225. The data processing system (e.g., via content selector) can further provide a content item 215, such as an advertisement for a taxi service. The content item 215 may include a sponsored link included by the search engine (or content selector) in the search results. The content item 215 may include a link or button to click for a phone number 220, as well as a web address to a target or landing web page. The user may click the phone link 220, which may facilitate providing log entry data and content item impression data, and the data processing system may, responsive to receiving the selection, provide the virtual phone number 230. The virtual phone number 230 may be a pop up window, replace the link 220, be displayed adjacent to the content item, and be sent to the user device via a notification, alert, SMS text message or email.

Still referring to FIG. 2, the example user interface 200 to provide a content item 215 with a virtual number 220, in accordance with some implementations. The user interface includes a search engine user interface 205 or search engine results page 205. The search engine 205 includes an input text box 210 in which a user may enter a search query, such as taxi. The search engine 205 can provide search results 225 (e.g., search results 1, etc.). The data processing system (e.g., via content selector 130) can select content items responsive to the search query, and provide them for display alongside the search results in response to the search query 210. The data processing system can establish, generate or otherwise identify a unique content impression identifier for the content item impression. A content item impression can refer to a presentation of the content item via a computing device. A content item impression can refer to displaying the content item, playing the content item, transmitting the content item to the computing device, or selecting the content item to provide to the computing device. In some cases, the data processing system can generate the content impression identifier responsive to interaction with the content item, such as responsive to a click or selection of the content item. The content item impression identifier can include or be based on one or more parameters or fields, such as a process identifiers or IP address identifiers associated with the content item or content item impression. In this example, the advertisement 215 may be for a taxi service provider. The taxi service provider may have setup an advertisement campaign or advertisement group that includes content selection criteria that includes the term "taxi". The advertisement may include a web link 235 to the taxi provider's website. The advertisement 215 may further include a link 220 to access a virtual number. A user may select the link 220. Responsive to receiving the selection of the link, the data processing system (e.g., via the virtual number engine 230) may display a virtual phone number 230. The virtual phone number 230 may be displayed via a pop-up window, by replacing the text 220, by directing the user to another website. In some cases, selecting the link 220 may cause the user's device to call the virtual phone number. For example, the data processing system 120 may receive the selection, provide the virtual phone number to the user's device, and instruct the user's device to further call the virtual phone number.

When the data processing system 120 receives a selection of the advertisement 215, link 220, or other request for a phone number corresponding to the advertisement 215, the data processing system can access a database storing a mapping of content items to virtual phone numbers to map the selected content item or content item impression identifier to a first virtual phone number. The database may be stored in data repository 155 and include a mapping of several content items, content groups, or content campaigns to virtual phone numbers. The database may include mappings of content providers to virtual phone numbers. In some implementations, the database may dynamically assign virtual phone numbers, and then store, in the database, a mapping of the dynamically generated/assigned virtual phone number to the content provider, content campaign, content group, or content item.

The data processing system 120 may perform a lookup in the database to map the content item to the virtual phone number. The data processing system 120 may use a unique identifier of the content item (e.g., content item impression identifier), content campaign, content group, or content provider to perform the lookup to map the content item to the virtual phone number. For example, the data processing system 120 receives a selection of the phone number link 230. The selection of the phone number link 230 initiates a request for a virtual phone number from the data processing system 120. The request for the virtual phone number 120 may include information about the content item 215, such as a unique identifier of the content item or content provider. In some cases, the request may include a URL of the web page on which the content item is displayed, or the link to the target page 230, in which case the data processing system 120 may access the identified web page to map the content item to the virtual phone number. Thus, the data processing system 120 can use the identifier or other indicator associated with the content item 215 provided or associated with the request for the virtual phone number (via selection of link 220) to perform the lookup in the database to map the content item to the virtual phone number.

Figure 3:
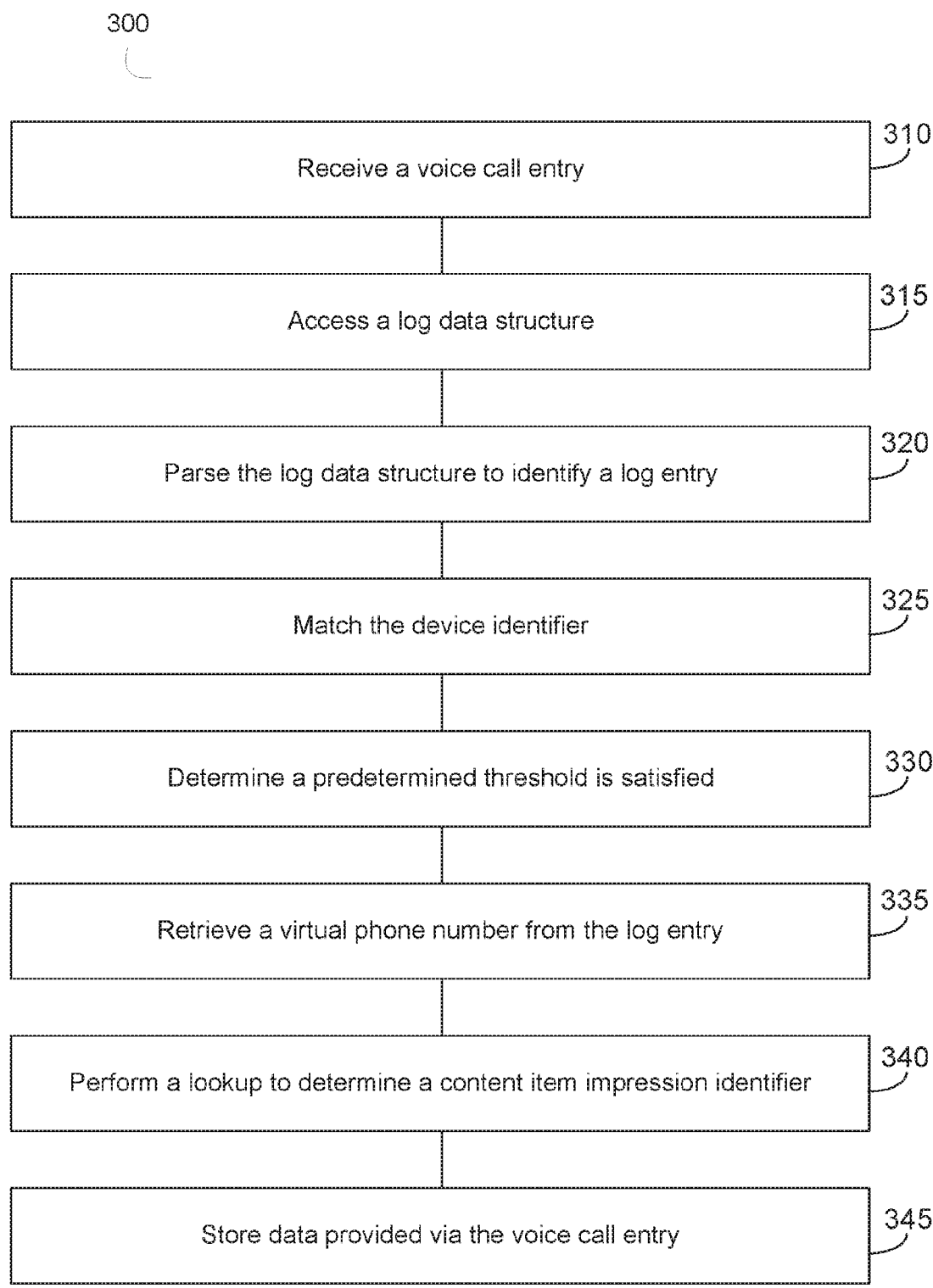
FIG. 3 is an illustration of a method of syncing data related to voice calls via a dynamically assigned virtual phone number in accordance with an implementation.

FIG. 3 shows an illustration of a method of syncing data via a computer network in accordance with an implementation. The method 300 can be performed via one or more system, component or interface illustrated in FIG. 1, FIG. 2 or FIG. 4, including, e.g., a data processing system, virtual number engine, tracker, content selector, provider interface, matching engine or data repository. In brief overview, and in some implementations, the method 300 includes a data processing system receiving a voice call entry at 310. At 315, the data processing system accesses a log data structure storing a plurality of log entries. At 320, the data processing system parses the log data structure to identify a log entry of the plurality of log entries. At 325, the data processing system matches the device identifier of the voice call entry with a device identifier of the log entry. At 330, the data processing system determines a predetermined threshold of a respective start time or duration of the log entry is satisfied. At 335, the data processing system retrieves a virtual phone number from the log entry. At 340, the data processing system performs a look-up to determine a content item impression identifier. At 345, the data processing system stores the data provided via the voice call entry in a data structure corresponding to the content item impression identifier.

In further detail, the method 300 includes a data processing system receiving a voice call entry at 310. The content provider can create the voice call entry and provide the voice call entry to the data processing system. The data processing system can receive one or more voice call entries. The data processing system can receive a data file, upload, or feed that includes one or more voice call entries. In some cases, the voice call entry can be pushed to the data processing system. In some cases, the data processing system can pull the voice call entry from a database or memory accessible via network and established by the content provider. In some cases, the data processing system can receive voice call entries in real-time; e.g., responsive to the content provider storing, recording, or generating the voice call entry.

The data processing system can receive the voice call entry via a communication channel established using a content account identifier. For example, the communication channel can be a secure communication channel that is established by the content provider logging into a provider interface provided by the data processing system. To log into the provider interface, the content provider may transmit authentication credential that can include, for example, a content account identifier, username, password, security code, fingerprint, biometric code, code texted to the content provider, etc. In some cases, the data processing system can be configured with multi-factor authentication.

The voice call entry can include one or more fields with one or more values in one or more formats. For example, a first field can identify a device identifier of a device initiating the voice call. A second field can identify a start time of the voice call. A third field can identify a duration of the voice call. A fourth field can include a conversion label. A fifth field can include a conversion value. The voice call entry can include a table or data structure format as illustrated in Table 3. The data processing system can convert values in the fields from one format to another format that may be more conducive to identifying matching entries or generating a report. For example, the start time in the voice call entry may be in a first time zone, while the start time stored in the log entry of the data processing system can be in a second time zone. The voice call entry may indicate the time zone (e.g., the second field can identify the start time and a time zone). The data processing system can convert the start time in the time zone to a default time zone different from the time zone. The default time zone can be the time zone used by the data processing system for the log entries. The default time zone can be UTC or GMT, or some other default time zone.

At 315, the data processing system accesses a log data structure storing a plurality of log entries. The data processing system can maintain the log data structure in memory of the data processing system. The log data structure can store a plurality of log entries corresponding to voice calls received by the data processing system. The data processing system can maintain the log data structure by storing in a data repository and be configured to access the log data structure to identify log entries. The data processing system can update the log data structure with new log entries for voice calls received by the data processing system. Receiving a voice call can refer to the data processing system receiving the voice call from a potential customer computing device, and then forwarding or bridging the call to a provider device of a content provider. The data processing system can update the log data structure based on a time interval, such as in real-time responsive to receiving the voice call; daily; hourly; in a batch mode, responsive to a condition, event or request.

In some cases, the log data structure can be encrypted in the data repository. The data processing system can be configured with authentication credentials or a security token that grants or authorizes the data processing system to access the log data structure.

The log data structure can maintain the log entries using a file structure format. For example, the log data structure can organize the log entries in a relational database. The data processing system can organize the log data structure or the log entries in the log data structure in a manner that facilities performing a search query, lookup, or otherwise parsing, identifying and retrieving log entries from the log data structure. For example, the log entries can be organized based on virtual phone number, receive date, start time, or duration.

At 320, the data processing system parses the log data structure to identify a log entry of the plurality of log entries. The data processing system can parse the log data structure to identify a first log entry of the data structure. In some cases, the data processing system can parse the data structure with a query that includes or is based on one or more of the device identifier, start time, and duration. In some cases, the data processing system can parsing the log data structure to identify the log entry by performing additional processes such as matching and a comparison with a threshold. For example, parsing the log data structure can include matching the device identifier of the voice call entry with a device identifier of the log entry. Parsing the log data structure can also include determining that a start time or duration stored in the log entry is within a predetermined threshold of a respective start time or duration stored in the voice call entry.

In some cases, the data processing system filters the log entries to identify one or more log entries that correspond to the content account identifier of the content provider. For example, the data processing system can maintain a data repository that includes log entries in a log data structure for multiple content providers. By pre-filtering the log entries prior to executing the query, the data processing system can more efficiently identify the matching query by using fewer computational resources such as processor clock cycles, memory, temporary memory, or network bandwidth. The data processing system may reduce a latency time for the search result by pre-filtering the log data structure based on the content provider account identifier. Thus, the data processing system can more efficiently identify matching log entries by executing the query on the filtered log data structure that is filtered based on the content account identifier.

At 325, the data processing system matches the device identifier of the voice call entry with a device identifier of the log entry. In some cases, the data processing system can perform a one-to-one mapping between the device identifier of the voice call entry and the device identify of the log entry to determine whether there is a match. A match can refer to an exact match. In some cases, the data processing system can filter our erroneous terms or formatting to identify the feature of the device identifier (e.g., ordered alphanumeric characters, and filter out or ignore punctuation or formatting such as dashes "–", slashes "/", periods ".", or capitalization). For example, the data processing system can convert the format of the device identifier in the voice call entry to the format of the device identifier stored in the log entry, and determine a match if the device identifiers in the same format are an exact match.

In some cases, the device identifier can be stored in the log entry with an encryption protocol. The device identifier can be stored in the log using an encrypted caller ID hash data format. The encryption protocol can include a hash encryption technique. The data processing system can perform a decryption technique to determine the device identifier. The decryption technique can include a reverse hash technique that determines the device identifier. Upon decrypting the stored encrypted caller ID, the data processing system can compare the device identifier indicated by the stored encrypted device identifier of the log entry with the device identifier of the voice call entry. Thus, the device identifier in the log entry can be stored in one or more formats or encrypted, and the data processing system, when performing the matching, can decrypt the stored device identifier or otherwise perform a format conversion to determine a match.

At 330, the data processing system determines that a predetermined threshold of a respective start time or duration of the log entry is satisfied. The data processing system can determine, responsive to matching the device identifier, that at least one of the start time or the duration of the voice call entry satisfies a predetermined threshold of a respective start time or duration of the log entry. The log entry can be stored in the data processing system and include information about a call received by the data processing system that resulted from a content item impression. The data processing system can access a log entry data structure to identify one or more log entries that correspond to the voice call entry by matching the device identifier included in the voice call entry with a device identifier indicated in the log entry.

The data processing system can determine the matching log entry by further determining that at least one of the start time or the duration of the voice call entry is within a predetermined threshold of a respective start time or duration of the log entry. For example, the data processing system can determine a range threshold for the start time or a range threshold for the duration, and generate a query with the range threshold. The query can identify log entries of the data processing system that include the same device identifier provided in the voice call entry, and a start time that falls within a range of the start time of the voice call entry. The query can identify log entries of the data processing system that include the same device identifier provided in the voice call entry, a start time that falls within a range of the start time of the voice call entry, and a duration that falls within a range of the duration of the voice call entry.

For example, the data processing system can identify a start time range for the start time of the voice call entry based on a predetermined time threshold. The data processing system can retrieve the predetermined time threshold and generate the start time range for a voice call entry as follows: start_time_range=[voice_call_entry_start_time–predetermined_threshold, voice_call_entry_start_time+predetermined_threshold]. The data processing system can identify a duration range for the duration of the voice call entry based on the duration predetermined threshold. The data processing system can retrieve the predetermined duration threshold and generate the duration range for a voice call entry as follows: duration_range=[voice_call_entry_duration–predetermined_duration_threshold, voice_call_entry_duration+predetermined_duration_threshold]. The data processing system can generate a query with a first term including the device identifier, a second term including the start time range and a third term including the duration range. For example, the query can be: {device_identifier; start_time_range; duration_range}. The data processing system can use the query to perform a lookup or search in the log data structure to identify the matching log entry.

The data processing system can adjust the thresholds based on historical matching performance. The data processing system can adjust the thresholds based on historical matching performance for the content account identifier. For example, if the thresholds used by the data processing system results in too many or too few log entries matching a voice call entry, the data processing system can adjust the threshold. For example, if the threshold results in more than 5 matching log entries, then the data processing system may lower the threshold. If the threshold results in zero, 1, 2 or 3 matching entries, then the data processing system may increase the threshold.

In some cases, historical matching performance can indicate a matching success rate. The data processing system may deem a match to be a success if a matching log entry is found. The data processing system can determine a matching success rate based on a number of successful matches divided by a number of voice call entries received by content provider. The data processing system can determine a matching success rate based on a number of successful matches divided by a number of search queries executed by the data processing system. The data processing system can compare the matching success rate with a matching threshold to determine whether to increase or decrease a predetermined range threshold. The matching threshold can be, for example, 10%, 20%, 30%, 40%, 50%, 60%, 75%, 90%, 95%, or 99%, 100% or some other percentage that facilitates tuning the predetermined range thresholds. The data processing system can increment or decrement the range threshold be a predetermined interval (e.g., 10 seconds; 20 seconds; 30 seconds; 1 minute; 5 minutes, etc.).

In an illustrative example, the data processing system determines that a matching success rate is 9%. The data processing system can compare the matching success rate with a matching threshold, which may be 90%. The matching threshold of 90% may indicate that the data processing system is configured to identify a matching log entry for 90% of the voice call entries provided by the content provider. Responsive to determining that the matching success rate of 9% is less than or equal to (e.g., does not satisfy) the matching threshold of 90%, the data processing system can increase the range threshold for at least one of the start time and the duration used for the query in order to identify additional log entries. The data processing system can then re-run or re-execute the updated query with the new ranges. The data processing system may continue to update the query and re-execute the query on the same data set until the matching threshold is satisfied (e.g., the matching success rate equals or exceeds the matching threshold).

At 335, the data processing system retrieves a virtual phone number from the log entry. The data processing system can retrieve the virtual phone number from the log entry responsive to determining that the predetermined threshold is satisfied. The data processing system may have dynamically assigned the virtual phone number dynamically to a content item of the content provider. The data processing system may have provided the virtual phone number to the device having the device identifier of the log entry responsive to an interaction with the content item of the content provider.

The data processing system may have previously provided the virtual phone number of the content item to the device. For example, the data processing system can receive a request for content for display via the device having the device identifier. The data processing system can select the content item responsive to the request (e.g., based content selection criteria, keywords, search terms, topic, or location). The data processing system can provide the selected content item for display with the device having the device identifier. The data processing system can create a content item impression identifier and assign the ID to the content item impression. The data processing system can create a content item impression record for the content item impression ID. The data processing system can receive an indication of interaction with the content item. For example, the interaction can be in the form of a click or selection of a button or link of the content item. Responsive to receiving the indication, the data processing system can provision the virtual phone number to the content item and provide the virtual phone number to the device having the device identifier.

The data processing system can receive the voice call made to the provisioned virtual phone number. The voice call can indicate the device identifier and the provisioned virtual phone number. For example, the data processing system can determine the device identifier via caller ID. The data processing system can determine the provisioned virtual phone number because that is the phone number via which the data processing system received the call. Responsive to receiving the call, the data processing system can detect the start time of the voice call. This start time can be the start time as detected or determined by the data processing system. This start time can be in a default time zone. The data processing system can store the start time of the voice call in the log entry. The data processing system can further detect or determine that the voice call has ended or terminated or that that the device having the device identifier has disengaged from the call (e.g., hung up). The data processing system can store, in the log entry, a duration of the call based on when the call terminated.

In some implementations, the data processing system can match a received call to the original content item using recorded information about the content item itself. The data processing system can record the information about the content item when the data processing system assigns the virtual phone number to the content item. When the data processing system receives a call, the data processing system can look up the recorded information from the virtual number record, and log that information about the content item along with the call information. Thus, in some implementations, the data processing system can indirectly rely on the virtual number to link the phone call to the originating content item, without using the virtual number to look up logs. For example, the data processing system can identify the content item impression identifier when the data processing system receives the voice call made to the provisioned virtual number.

At 340, the data processing system performs a look-up to determine a content item impression identifier. The data processing system can perform the lookup in a content item impression data structure using the identified virtual phone number to determine a content item impression identifier identifying an impression of a content item that resulted in a provision of the virtual phone number to the content item.

At 345, the data processing system stores the data provided via the voice call entry in a data structure corresponding to the content item impression identifier. In some cases, the data processing system updates a data structure corresponding to the content item impression with information provided in the voice call entry. The data processing system can update the content item impression data structure or a different data structure corresponding to the content item impression to attribute the voice call to the identified content item impression. The data processing system can further attribute data or information about the voice call entry to the content item impression, such as a conversion type, conversion label or conversion value.

For example, the data processing system can parse or identify one or more fields of the voice call entry. The data processing system can identify a fourth field in the voice call entry that identifies a conversion label for the voice call that was assigned by the content provider. The conversion label can include, e.g., a purchase, a subscription, or a survey. The data processing system can identify a fifth field in the voice call entry to identify a conversion value for the voice call assigned by the content provider. The conversion value can include numeric values, strings, grades (e.g., A, B, C, D, or F), categories (e.g, high value, medium value, low value), or a scale (e.g., 1 to 10, with 1 being lowest value and 10 highest, or 1 highest and 10 lowest). For example, the conversion value can be $800 or "high".

In some cases, the data processing system can identify multiple log entries that match a voice call entry or satisfy the query with the threshold ranges. For example, a second log entry can satisfy the start time range and duration range. To determine a single matching entry, the data processing system can compare the start times of the two matching log entries to identify the log entry with the start time that is closest to the start time of the voice call entry. In some cases, the data processing can compare the durations of the two matching log entries to identify the log entry with the duration that is closest to the duration of the voice call entry. For example, if the start times of the two matching entries are the same, the data processing system can then do a further comparison based on the duration to identify the log entry with the duration closest to the duration provided in the voice call entry.

In one implementation, the data processing system determines a second log entry maintained in memory of the data processing system that corresponds to the voice call entry by matching the device identifier included in the voice call entry with a second device identifier indicated in the second log entry and determining that the start time of the voice call entry is within a predetermined threshold of a respective second start time of the second log entry. The second device identifier can be the same as the first device identifier. For example, the data processing system can use a query that includes the device identifier such that the log entry matches the unique device identifier. However, in some cases, the device identifier in the log entry may not be unique, in which case the data processing system may identify multiple log entries with the same device identifier. In some cases, the device identifier may be partially missing or corrupt, in which case the data processing system can identify multiple log entries that match the device identifier provided in the voice call entry.

The data processing system can determine a first difference between the start time of the first log entry and the start time of the voice call in the voice call entry (or respective durations). The data processing system can determine a second difference between the second start time of the second log entry and the second start time of the voice call in the voice call entry (or respective durations). The data processing system can select the first log entry as a matching entry based on a comparison of the first difference and the second difference (e.g., the smaller difference). The data processing system can then use the matching entry to identify the virtual phone number.

Figure 4:
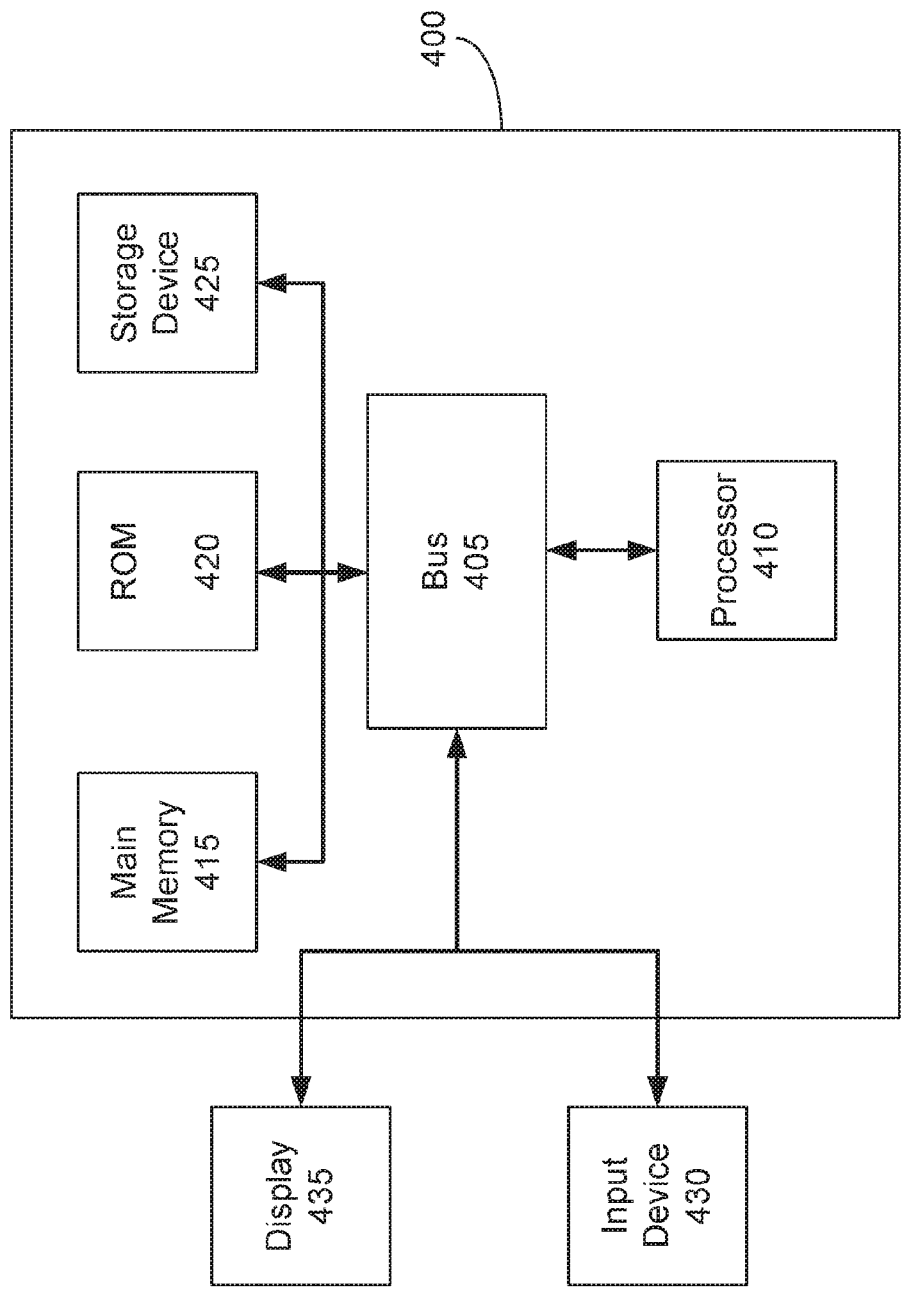
FIG. 4 is a block diagram illustrating a general architecture for a computer system that may be employed to implement various elements of the system shown in FIG. 1, the user interface shown in FIG. 2, the method shown in FIG. 3, among others, in accordance with an implementation.

FIG. 4 is a block diagram of a computer system 400 in accordance with an illustrative implementation. The computer system or computing device 400 can be used to implement the system 100, system 800, content provider 125, computing device 110, content publisher 115, data processing system 120, virtual number engine 135, tracker 140, content selector 130, provider interface 145, matching engine 150 and data repository 155. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. Main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, is coupled to the bus 405 for persistently storing information and instructions.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. In alternative implementations, hard-wired circuitry may be used in place of or in combination with software instructions to effect illustrative implementations. Thus, implementations are not limited to any specific combination of hardware circuitry and software.

Although an example computing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices).

The operations described in this specification can be performed by a data processing apparatus on data stored on one or more computer-readable storage devices or received from other sources.

The term "data processing apparatus" or "computing device" encompasses various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a circuit, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more circuits, subprograms, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

References to "or" may be construed as inclusive so that any terms described using "or" may indicate any of a single, more than one, and all of the described terms.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method of syncing data via a network to address inaccuracies in different data sets, comprising:
    identifying, by one or more processors of a data processing system, a voice call entry corresponding to a voice call received by a provider device of a content provider, the voice call entry comprising one or more fields;
    matching, by the data processing system, the voice call entry with a log entry, the log entry corresponding to one or more voice calls received by the data processing system;

determining, by the data processing system responsive to the matching, that at least one of a start time or a duration of the voice call entry satisfies a predetermined threshold of a respective start time or duration of the log entry, the predetermined threshold selected to address inaccuracies between the voice call entry and the log entry;

retrieving, by the data processing system responsive to determining that the predetermined threshold is satisfied, a virtual phone number from the log entry, the virtual phone number dynamically assigned by the data processing system to a content item of the content provider and provided to a device having a device identifier of the log entry responsive to an interaction with the content item of the content provider;

performing, by the data processing system, a lookup in a content item impression data structure using the identified virtual phone number to determine a content item impression identifier identifying an impression of the content item that resulted in a provision of the virtual phone number to the content item; and updating, by the data processing system based on the voice call entry satisfying the predetermined threshold selected to address inaccuracies for the voice call entry, a data structure corresponding to the content item impression identifier with data provided via the voice call entry.

2. The method of claim 1, wherein the voice call entry includes a device identifier field, the method comprising:
matching, by the data processing system, the device identifier included in the voice call entry with the device identifier indicated in the log entry.

3. The method of claim 1, wherein the one or more fields of the voice call entry comprise a first field identifying the device identifier of the device initiating the voice call, a second field identifying the start time of the voice call, and a third field identifying the duration of the voice call.

4. The method of claim 1, wherein the data processing system is configured to forward incoming calls from the virtual phone number to a pre-set identifier of the provider device.

5. The method of claim 1, comprising:
forming a tuple from the device identifier and the virtual phone number; and
mapping the tuple to a pre-set identifier of the provider device.

6. The method of claim 1, comprising:
receiving, by the data processing system from the content provider, via a communication channel established using a content account identifier, the voice call entry.

7. The method of claim 1, comprising:
parsing, by the data processing system, the one or more fields in the voice call entry to identify a conversion label for the voice call, the conversion label assigned by the content provider; and
updating, by the data processing system, the data structure corresponding to the impression of the content item to attribute the conversion label to the impression of the content item.

8. The method of claim 7, wherein the conversion label includes at least one of a purchase, a subscription, or a survey, the method comprising:
parsing, by the data processing system, the one or more fields in the voice call entry to identify a conversion value for the voice call, the conversion value assigned by the content provider; and
updating, by the data processing system, the data structure corresponding to the impression of the content item to attribute the conversion value to the identified content item impression.

9. The method of claim 1, comprising:
receiving, by the data processing system, a request for content for display via the device having the device identifier;
selecting, by the data processing system, the content item responsive to the request;
providing, by the data processing system, the selected content item for display via the device having the device identifier;
provisioning, by the data processing system responsive to receiving an indication of interaction with the content item, the virtual phone number to the content item, the content item associated with the content item impression identifier; and
providing, by the data processing system, the provisioned virtual phone number to the device having the device identifier.

10. The method of claim 9, comprising:
receiving, by the data processing system, the voice call made to the provisioned virtual phone number, the voice call indicating the device identifier and the provisioned virtual phone number;
detecting, by the data processing system, responsive to receiving the voice call, the start time of the voice call;
detecting, by the data processing system, termination of the voice call; and
storing, by the data processing system, the start time of the voice call and the duration of the voice call in the log entry.

11. A system to sync data via a network to address inaccuracies in different data sets, comprising:
a data processing system comprising one or more processors configured to:
identify a voice call entry corresponding to a voice call received by a provider device of a content provider, the voice call entry comprising one or more fields;
match the voice call entry with a log entry, the log entry corresponding to one or more voice calls received by the data processing system;
determine, responsive to the match, that at least one of a start time or a duration of the voice call entry satisfies a predetermined threshold of a respective start time or duration of the log entry, the predetermined threshold selected to address inaccuracies between the voice call entry and the log entry;
retrieve, responsive to the determination that the predetermined threshold is satisfied, a virtual phone number from the log entry, the virtual phone number dynamically assigned by the data processing system to a content item of the content provider and provided to a device having a device identifier of the log entry responsive to an interaction with the content item of the content provider;
perform a lookup in a content item impression data structure using the identified virtual phone number to determine a content item impression identifier identifying an impression of a content item that resulted in a provision of the virtual phone number to the content item; and
update, based on the voice call entry satisfying the predetermined threshold selected to address inaccuracies for the voice call entry, a data structure corresponding to the content item impression identifier with data provided via the voice call entry.

12. The system of claim 11, wherein the voice call entry includes a device identifier field, and the data processing system is further configured to:
match the device identifier included in the voice call entry with the device identifier indicated in the log entry.

13. The system of claim 11, wherein the one or more fields of the voice call entry comprise a first field identifying the device identifier of the device initiating the voice call, a second field identifying the start time of the voice call, and a third field identifying the duration of the voice call.

14. The system of claim 11, wherein the data processing system is further configured to forward incoming calls from the virtual phone number to a pre-set identifier of the provider device.

15. The system of claim 11, wherein the data processing system is further configured to:
form a tuple from the device identifier and the virtual phone number; and
map the tuple to a pre-set identifier of the provider device.

16. The system of claim 11, wherein the data processing system is further configured to:
receive, from the content provider, via a communication channel established using a content account identifier, the voice call entry.

17. The system of claim 11, wherein the data processing system is further configured to:
parse the one or more fields in the voice call entry to identify a conversion label for the voice call, the conversion label assigned by the content provider; and
update the data structure corresponding to the impression of the content item to attribute the conversion label to the impression of the content item.

18. The system of claim 17, wherein the conversion label includes at least one of a purchase, a subscription, or a survey, and the data processing system is further configured to:
parse the one or more fields in the voice call entry to identify a conversion value for the voice call, the conversion value assigned by the content provider; and
update the data structure corresponding to the impression of the content item to attribute the conversion value to the identified impression of the content item.

19. The system of claim 11, wherein the data processing system is further configured to:
receive a request for content for display via the device having the device identifier;
select the content item responsive to the request;
provide the selected content item for display via the device having the device identifier;
provision, responsive to receiving an indication of interaction with the content item, the virtual phone number to the content item, the content item associated with the content item impression identifier; and
provide the provisioned virtual phone number to the device having the device identifier.

20. The system of claim 19, wherein the data processing system is further configured to:
receive the voice call made to the provisioned virtual phone number, the voice call indicating the device identifier and the provisioned virtual phone number;
detect responsive to receiving the voice call, the start time of the voice call;
detect termination of the voice call; and
store the start time of the voice call and the duration of the voice call in the log entry.

* * * * *